United States Patent
Meridiano et al.

(10) Patent No.: US 11,501,127 B2
(45) Date of Patent: Nov. 15, 2022

(54) METHOD FOR PRODUCING A METAL RADIO-FREQUENCY CHIP CARD WITH IMPROVED ELECTROMAGNETIC PERMITTIVITY

(71) Applicant: THALES DIS FRANCE SAS, Meudon (FR)

(72) Inventors: Jean-Luc Meridiano, Gémenos (FR); Arek Buyukkalender, Gémenos (FR); Claude Colombard, Gémenos (FR); Frédérick Seban, Gémenos (FR); Lucile Mendez, Gémenos (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/416,862

(22) PCT Filed: Dec. 6, 2019

(86) PCT No.: PCT/EP2019/084085
§ 371 (c)(1),
(2) Date: Jun. 21, 2021

(87) PCT Pub. No.: WO2020/126571
PCT Pub. Date: Jun. 25, 2020

(65) Prior Publication Data
US 2022/0058457 A1 Feb. 24, 2022

(30) Foreign Application Priority Data
Dec. 21, 2018 (EP) .................... 18306803

(51) Int. Cl.
*G06K 19/077* (2006.01)
(52) U.S. Cl.
CPC ... *G06K 19/0772* (2013.01); *G06K 19/07773* (2013.01)

(58) Field of Classification Search
CPC ........ H01Q 13/10; H01Q 21/065; H01Q 9/04; H01Q 1/2225; H01Q 9/065;
(Continued)

(56) References Cited

U.S. PATENT DOCUMENTS

| 7,999,684 | B2 * | 8/2011 | Fenkanyn | B60C 23/0493 |
| | | | | 235/382 |
| 10,694,399 | B1 * | 6/2020 | Tran | H01Q 3/01 |

(Continued)

FOREIGN PATENT DOCUMENTS

| CN | 1862566 B * | 5/2010 | ....... G06K 19/07749 |
| CN | 102474002 A * | 5/2012 | ........... H01Q 1/1271 |

(Continued)

OTHER PUBLICATIONS

Michal Mrnka et al., An_Effective_Permittivity_Tensor_of_Cylindrically_Perforated_Dielectrics, Jan. 2018.*

(Continued)

*Primary Examiner* — Thien T Mai
(74) *Attorney, Agent, or Firm* — Marc Boillot; Thales DIS CPL USA, Inc

(57) ABSTRACT

A method for producing a metal insert for a radio-frequency chip card includes the steps of forming or providing an assembly comprising an insulating substrate bearing: at least one antenna coil resting on the substrate, comprising a connection interface to a radio-frequency module, a metal plate comprising radio-frequency permittivity perforations and a cavity for receiving a radio-frequency chip module, respectively arranged facing the antenna coil and its connection interface. The perforations comprise at least two longitudinal slots extending along and facing a portion of the antenna coil, each slot also opening onto the edge of the plate via a passage arranged on the edge. The invention also relates to a corresponding card produced by the method.

10 Claims, 2 Drawing Sheets

(58) Field of Classification Search
CPC ......... G06K 19/0723; G06K 19/07771; G06K 19/07749; G06K 19/07773; G06K 19/07779; G06K 19/077; G06K 19/07786; G06K 19/0772; G06K 19/0773; G06K 19/07735; G06K 19/07756

See application file for complete search history.

(56) References Cited

U.S. PATENT DOCUMENTS

| | | | |
|---|---|---|---|
| 2013/0293424 A1* | 11/2013 | Zhu | H01Q 13/10 |
| | | | 343/702 |
| 2015/0269477 A1 | 9/2015 | Finn et al. | |
| 2015/0317919 A1* | 11/2015 | Hofer | A01N 59/16 |
| | | | 235/492 |
| 2016/0011091 A1* | 1/2016 | Huang | A61B 5/1038 |
| | | | 73/841 |
| 2017/0324135 A1* | 11/2017 | Blech | H01Q 1/38 |
| 2018/0132376 A1 | 5/2018 | Shin et al. | |

FOREIGN PATENT DOCUMENTS

| | | |
|---|---|---|
| EP | 2612764 A2 | 7/2013 |
| WO | 2018178314 A1 | 10/2018 |

OTHER PUBLICATIONS

International Search Report (PCT/ISA/210) with translation and Written Opinion (PCT/ISA/237) dated Feb. 21, 2020, by the European Patent Office as the International Searching Authority for International Application No. PCT/EP2019/084085.

* cited by examiner

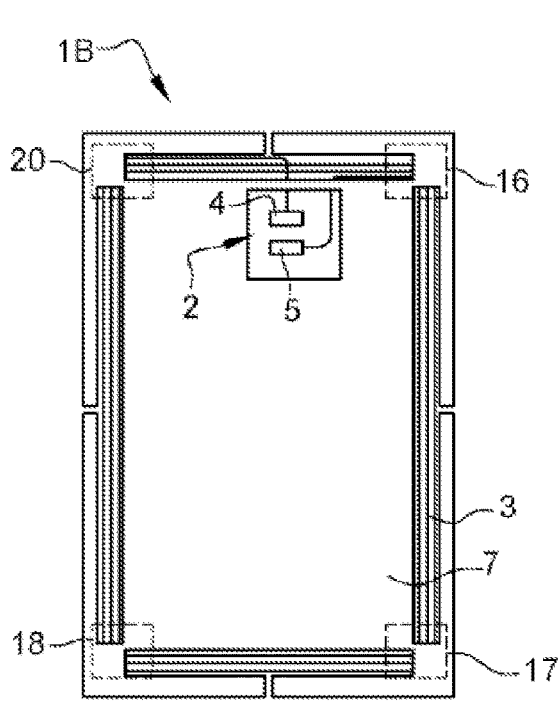
Fig. 4
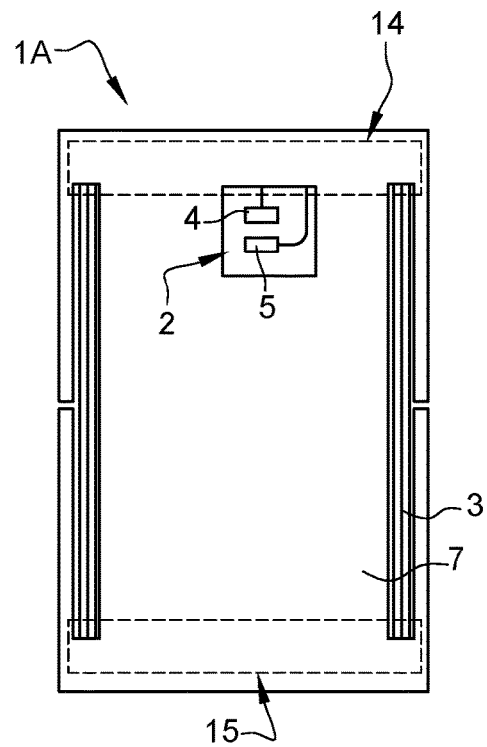
Fig. 5
Fig. 6
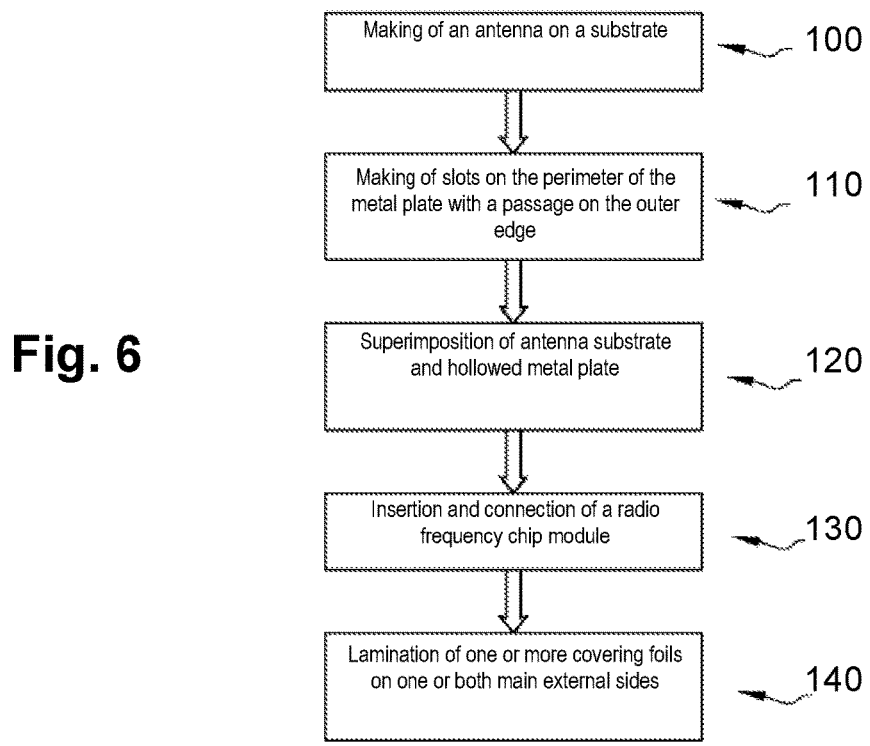

METHOD FOR PRODUCING A METAL RADIO-FREQUENCY CHIP CARD WITH IMPROVED ELECTROMAGNETIC PERMITTIVITY

FIELD OF THE INVENTION

The invention relates to the field of contactless chip cards comprising a high metal content or a metal plate extending at least up to one edge of the card and a radio frequency integrated circuit chip module.

It is particularly intended for the manufacture of a smart card comprising at least one metal plate in the card body and offering improved electromagnetic permittivity.

Chip cards can be of the hybrid type (contact type and contactless) or purely contactless (with no electrical contact terminal pad). In principle, the plate is contained in an insert covered by at least one outer cover foil or film.

Chip cards may have a chip card module comprising a radio frequency transponder with the chip and the antenna carried on an insulating substrate of the module. Radio frequency chip card modules are generally embedded in a recess in the card body. They may also connect an antenna housed in the card body via electrical interconnection elements, connecting terminal pads of the antenna to connection areas of the chip placed on the module.

A chip card radio frequency module may be coupled with a passive antenna or relay housed in the card body.

This invention relates more particularly to metal bank, payment and transport cards.

PRIOR ART

Patent FR 2743649 describes a chip card module with an antenna and/or contact pads which can be incorporated into a card body recess or form an RFID electronic tag.

Furthermore, hybrid radio frequency devices are also known, such as contact type and contactless cards, comprising a chip card module with contacts incorporated in a card body and connected to an antenna housed in the card body.

Furthermore, there are bank cards comprising metal elements inserted inside the plastic card body or on the outer surface of the card body such as aluminium, titanium or gold. The metal makes the card feel heavy, which is highly appreciated by users. It also gives it a visible aesthetic appearance, making it a high-end premium product.

Patent application US2015/0269477 AI describes a metal smart card comprising an antenna on a substrate and a metal plate with a series of holes arranged on the substrate. The holes are arranged above the path of the antenna turns.

The radio frequency communication performance tested by the inventors is insufficient despite the presence of holes above the path of the antenna turns.

There is currently a strong demand for this type of smart card incorporating heavy materials, but they are not easy to manufacture or the weight/performance ratio of radio frequency communication is not optimal.

Technical Problem

The invention aims to overcome the aforementioned drawbacks.

In particular, the invention is aimed at achieving a metal card structure offering higher communication performance than in the prior art.

The card may preferably also have a structure that meets mechanical strength requirements—in terms of ISO for all other tests and durability over time.

SUMMARY OF THE INVENTION

In a preferred aspect, the invention consists of a particular arrangement (or configuration) of the perforations or recesses in a metal plate so as to increase the permittivity of the metal plate with regard to the electromagnetic field of a radio frequency reader.

The holes are elongated and placed along the path of the antenna turns and metal-free passages extend from each slot and open on the edge of the plate.

This configuration of perforations allows proper distribution of the radio frequency field in the card despite the presence of metal, which leads to high communication performance both in the two directions of the Z-axis perpendicular to the main plane X, Y of the card but also laterally in that plane.

To that end, the invention relates to a method for manufacturing a metal insert for a radio frequency chip card, where said method comprises the steps of forming or supplying an assembly comprising an insulating substrate carrying:
 at least one antenna turn resting on said substrate, comprising an interface for connection to a radio frequency module,
 a metal plate comprising radio frequency permittivity perforations and a recess for receiving a radiofrequency chip module, arranged respectively facing said antenna turn and its connection interface.

The method is characterised in that said perforations comprise at least two slots, each extending along and facing a portion of antenna turns, and also opening on the edge of the plate via a passage formed on said edge.

According to other characteristics:
 Said turn portions preferably extend in the immediate vicinity of lateral or longitudinal edges of the plate;
 The method comprises the formation, in said plate, of at least a third continuous slot or third and fourth continuous slots, where each of said slots extends between the first and second turn portions, diametrically or symmetrically opposed to each other or separated by a coupling surface portion;
 Said slots form an electromagnetically permeable passage for the radiation induced by the turns;
 The chip may be connected in an ohmic, capacitive or inductive way to said antenna;
 The insert may be covered with at least one or more covering or decorative polymer foils.

The invention also relates to a metal insert for a radio frequency chip card, where said insert comprises an assembly of an insulating substrate with a metal plate, where said substrate carries at least one antenna turn and said plate comprises radio frequency permittivity perforations and a recess for receiving a radio frequency chip module, where said perforations are arranged facing said antenna turn, characterised in that said perforations comprise at least two slots each extending along opposite or parallel edges of said plate, along and facing a portion of an antenna turn, where each slot also opens on the edge of the plate via a passage formed on said edge.

DESCRIPTION OF DRAWINGS

FIG. 4 illustrates an assembly according to the first preferred embodiment of the invention with the plate in FIG. 2;

FIG. 5 illustrates an assembly according to the second preferred embodiment of the invention with the plate in FIG. 3;

FIG. 6 illustrates the steps of the method according to the invention in its preferred embodiment.

DESCRIPTION

The method for manufacturing a metal insert for a radio frequency chip card will now be described.

Figure 1:
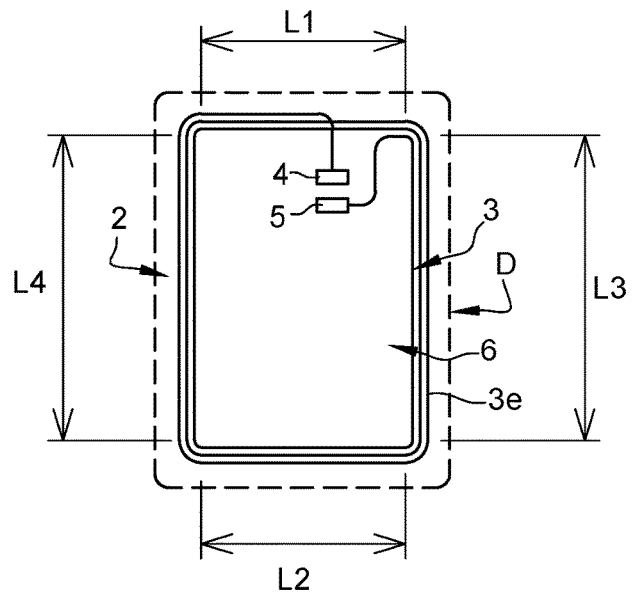
FIG. 1 illustrates an antenna made on an insulating substrate according to a step of one embodiment of the method of the invention.
Figure 2:
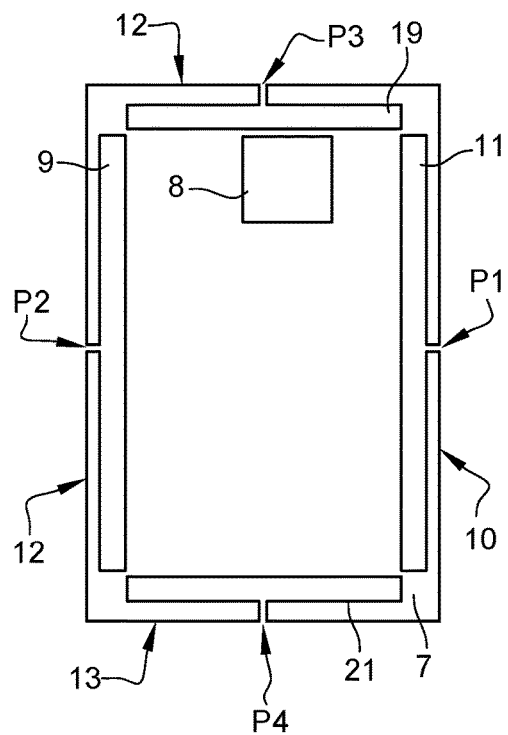
FIG. 2 illustrates openings made in a metal plate according to a first-preferred embodiment of the method of the invention.
Figure 3:
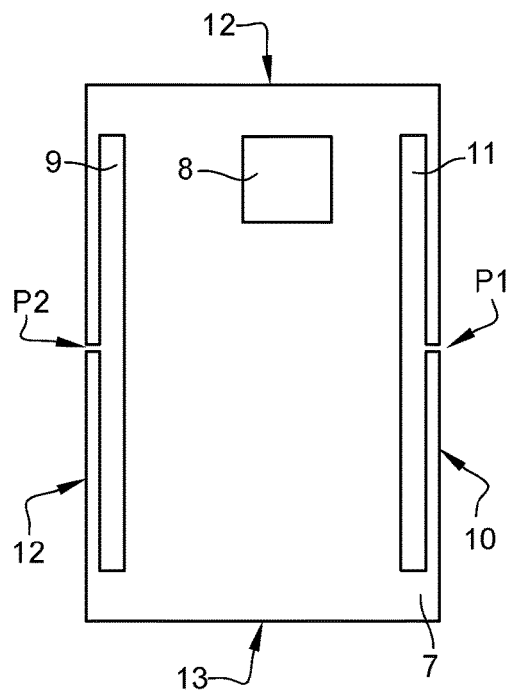
FIG. 3 illustrates openings made in a metal plate according to a second preferred embodiment of the method of the invention.

According to one characteristic, the method provides for the formation or supply of an assembly 1 (FIG. 4) comprising an insulating substrate 2 visible in FIGS. 1 and 3 and a metal plate visible in FIG. 2.

In FIG. 1, the substrate 2 carries at least one antenna turn 3 with two terminal ends 4, 5, resting on said substrate, and a coupling surface 6 inside the outer turn 3e of the antenna 3;

The antenna in chip card size may be made at the same time as a plurality of antennas on a large (e.g., 60×100 cm) insulating substrate, particularly in plastic such as PVC, PC or PET. The antenna may be extracted subsequently at the dotted lines "D" which illustrate the perimeter of the insert, by punching or laser cutting, whether or not it is associated with a metal plate. The antenna is made here by ultrasonically inlaying wire, but may be made using any known technique such as copper or aluminium engraving, screen printing, depositing a jet of conductive material, cutting the antenna by punching or laser in metal foil.

The antenna may include its terminal ends 4, 5 for interconnection to a module also preferably resting on the substrate 3, but that is not a requirement. Its ends may be left in the air. In the example, the terminal ends are also made by zigzags of inlaid wires. They may be made using any known technique relating to the above antenna. The ends may constitute or comprise or be replaced by a coupling and/or interconnection interface such as for example a coupling coil for connecting a radio frequency transponder in an antenna module.

The assembly 1 also comprises, as indicated above, a metal plate 7 (FIG. 2 or FIG. 3) comprising radio frequency permittivity perforations 9, 11, 19, 21, a recess 8 for receiving a radiofrequency chip module.

The perforations and recess pass through the plate. The perforations 9 and 11 are arranged respectively facing said antenna turn and its ends.

According to one characteristic of this preferred embodiment, the perforations comprise at least two longitudinal slots 9, 11 each extending over at least one of the (preferably diametrically or symmetrically) opposite edges (10, 12) of said plate 7, along and facing a portion L3, L4 of the antenna turn (3), where each slot 9, 11 also opens on the edge 10, 12 of the plate via a passage P1, P2 formed on said edge 10, 12.

The passage P1, P2 may be located at any place on the side or the edge of the card. In the examples, the passages are located substantially at the centre of each slot or elongated opening 9, 11. However, each passage may be positioned substantially in a central zone or start zone or end zone of each slot.

The passages (or mini-slots or cutouts) may, for example, be about 0.5 to 5 mm wide.

These turn portions L1, L2 are symmetrically opposed to each another or separated by a coupling surface.

In the example (FIG. 4), the turn portions L1 and L2 are approximately as wide as a chip card body. In fact, the slots 9 and 11 have substantially the same lengths as these portions of antenna turns.

The portions of turns L1 and L2 are symmetrically opposed here because the slots cover the transverse sides of the antenna 3 with a rectangular shape extending along the peripheral edges of the chip card insert or of the assembly 1. These turn portions (straight here) are separated from an intermediate central zone 6 forming an electromagnetic coupling surface inside the outer turn 3e of the antenna in the form of a spiral or coil.

Alternatively, the turn portions L1 and L2 can be replaced respectively by longitudinal portions L3 and L4.

The lengths L1, L2, L3, L4 may be between 3 cm and 5 cm. Preferably, if L1-L4 openings or perforations are made on the width of the card, the length may be between 2.5 cm and 4.9 cm. If the openings or perforations L1-L4 are made on the length, it may be between 4.5 cm and 8.2 cm.

The slots 9 and 11 may extend over almost the entire width or length of the metal plate and be only a few millimetres 4 to 15 mm back from the longitudinal peripheral edges.

The slots here have a "La" width of 5 to 6 mm to uncover 6 antenna turns. More precisely, the width of the openings or slots may preferably be greater than the width of the bundle of turns by at least 1 mm on either side of the bundle.

Here, the metal plate is a steel plate with a thickness equal to approximately 500 µm. It may vary from 150 to 650 µm. It may be made up of an assembly of several metal plates.

Alternatively, the antenna has a non-rectangular, oval or rounded shape and the turn portions concerned may be diametrically opposed.

Said turn portions preferably extend in the immediate vicinity of the lateral or longitudinal edges of the plate. The turns may for example be set back 2 to 5 mm from these edges so as to have maximum coupling surface inside the outer turn.

According to another characteristic, the method according to the preferred embodiment may comprise the formation in said plate, of at least four slots 9, 11, 19, 21, where each of said slots extends respectively on at least one of the four sides of said plate, along and facing a significant portion of the antenna turn, where each slot opens out via a passage formed, also on one of the outer edges of said plate adjacent to or parallel to said slot.

Advantageously, the elongated slots form a passage that is more electromagnetically permeable and more efficient than a series of holes of the prior art, comparatively offering the same area of removed metal.

The metal-free passages P1-P4 may be filled with resin subsequently, in particular during assembly with cover foil.

In FIG. 4 or 5, a simply radio frequency module MI can be connected to the antenna before assembly to the plate in FIG. 2 or that in FIG. 3.

Alternatively, a hybrid chip card module M2 (contact type and contactless) may in particular be connected after laminating the foils and machining a recess.

The characteristics of the assembled elements as indicated in FIG. 4 or 5 provided good performance results:

Steel plate from 300 μm to 450 μm
Card body made in PVC/
Chip SLC32G298/Mask G298/Infineon The results comply fully with EMVCo standards with minimum H of 1.1 A/m with a standard antenna with 5 turns.

In the example, the module may be connected to the terminal interconnection portions 4, 5 of the antenna 3. However, the module may be connected capacitively, for example by having at least one capacitor plate facing one of the lands 4 or 5.

The module may also be connected inductively to the antenna, which may be configured to form a passive antenna or relay.

For example, the recess may comprise, in a known manner, a small coil (not shown) on the lands 4 and 5 in order to form an electromagnetic coupling loop which couples with an antenna and radio frequency chip module introduced above the coupling coil.

Thus, the radio frequency chip of the module can be connected ohmically or capacitively or inductively to said antenna 3.

The assembly or insert 1 may then be covered with at least one or more covering or decoration polymer foils or layers. It may then be cut into standard chip card format to have metal card edges. If the edges of the plate are not visible, the method may provide for placing metal plates that are slightly smaller than a chip card on each substrate 3 and laminating the cover foils later on.

Prior to the addition of cover foils, the slots (or even the recess 8) are preferably filled with polymer resin. The recess 8 may be subsequently updated again with the interconnection pads 4, and 5 after the cover foils have been laminated In general, the invention provides for a metal insert structure for a radio frequency smart card comprising the following characteristics, which can be obtained in particular by the steps in the method illustrated in FIG. 6.

The insert may generally comprise an assembly 1 (FIG. 4) of an insulating substrate 2 with a metal plate 7.

In FIGS. 2, 3, the substrate carries at least one antenna turn and the plate 7 comprises radio frequency permittivity perforations and a recess 8 for receiving a radio frequency chip module. The recess may be made at the same time as the slots or subsequently after covering the assembly with at last one covering foil on at least one of the main sides.

The perforations are arranged opposite the antenna turn 3.

According to one characteristic, the perforations comprise at least two longitudinal slots 9, 11 (or even four, preferably) each extending preferably over at least one of the (symmetrically or diametrically) opposite edges 10, 12 of said plate 7, along and facing a portion L3, L4 of the antenna turn 3, where each slot 9, 11 also opens on the edge 10, 12 of the plate via a passage (or break P1, P2) formed on said edge 10, 12.

The assembly may possibly comprise ferrite rods inserted into the slots (and facing the module recess) to improve the passage of electromagnetic flow at least in a direction substantially perpendicular to a main plane of the card and to make the metal plate even heavier. The ferrite rods at least improve communication towards one side of the card.

In FIG. 5, steps of the method are illustrated.

In step 100, an antenna is produced on a substrate

In step 110, two slots are made in a metal plate and possibly also a recess 8 or a cutout 18 to receive a module. The slots are made with a passage P1-P4 opening onto the adjacent outer edge;

In step 120, the antenna substrate is superimposed (assembled) with the metal plate hollowed out in the previous step, the two slots 19, 21 being arranged on or facing the antenna portions or turns 3;

In step 130, a radio frequency chip module may be connected to a communication interface 4, 5 (The module and the antenna may be configured otherwise for connection—interconnection pads, coupling coil, capacitance—);

In step 140, one or more covering foils are laminated on one or both main outer sides of the assembly 1.

Where applicable, as an alternative, the recess 8 in the coating may be filled with resin before the covering foils are laminated and then the recess for receiving the module may be made after assembling the covering foils.

The chip card according to the invention may use a hybrid radio frequency chip module comprising contact pads which may also be perforated, outside the standardised reserved contact zones in order to further improve electromagnetic permittivity.

Where applicable, the method may provide, in each application, for making 14-20 finer areas of the plate at locations located near the antenna turns 3. That is to avoid excess thickness.

In all of the examples, the card body plate may comprise an assembly of metal plates welded together or assembled by means of a fine adhesive layer. That last assembly may improve mechanical bending/torsion resistance.

Thus, the invention makes it easy to manufacture a chip card comprising the insert described above for radio frequency performance compatible with chip card standards, in particular EMVco.

The invention claimed is:

1. A metal insert for a radio frequency chip card, said metal insert comprising an insulating substrate carrying:
   an antenna turn resting on said insulating substrate, comprising an interface for connection to a radio frequency module, and
   a metal plate comprising radiofrequency permittivity perforations and a cavity for receiving a radiofrequency chip module, respectively arranged opposite said antenna turn and its connection interface, wherein said perforations comprise at least two longitudinal slots each extending along and facing a respective portion of the antenna turn, where each slot also opens on an edge of the plate via a passage made on said edge.

2. The metal insert according to claim 1, wherein said turn portions extend in an immediate vicinity of lateral or longitudinal edges of the plate.

3. The metal insert according to claim 1, wherein the plate comprises at least four slots, where each of said slots extends respectively on at least one of the four sides of said plate, along and facing a significant portion of the antenna turn, where each slot opens out via a passage formed, also on one of the outer edges of said plate adjacent to or parallel to said slot.

4. The metal insert according to claim 1, wherein said slots form an electromagnetically permeable passage.

5. The metal insert according to claim 1, wherein the chip is ohmically or capacitively or inductively connected to said antenna.

6. The metal insert according to claim 1, wherein said insert is covered with at least one or more covering or decorative polymer foils.

7. A metal insert for a radio frequency chip card, where said insert comprises an assembly of an insulating substrate with a metal plate, where said insulating substrate carries an antenna turn resting on said insulating substrate, said antenna turn comprising an interface for connection to a radiofrequency module, said metal plate comprising radio frequency permittivity perforations and a recess for receiving a radiofrequency chip module, said frequency permittivity perforations and said recess passing through the metal plate and arranged respectively facing said antenna turn and its connection interface, wherein said perforations comprise at least two longitudinal slots each extending over respective opposite edges of said plate, along and facing a portion of the antenna turn, where each slot also open on the respective opposite edges of the plate via a passage formed on said respective opposite edges.

8. The metal insert according to claim 7, wherein the assembly comprises ferrite rods inserted in the slots.

9. The metal insert according to claim 7, wherein each passage is positioned substantially in a central zone or start zone or end zone of each slot.

10. A radio frequency chip card comprising a metal insert, wherein the metal insert comprises an assembly of an insulating substrate with a metal plate, where said insulating substrate carries an antenna turn resting on said insulating substrate, said antenna turn comprising an interface for connection to a radio frequency module, said metal plate comprising radiofrequency permittivity perforations and a recess for receiving a radiofrequency chip module, said perforations and recess passing through the metal plate and arranged respectively facing said antenna turn and its connection interface, wherein said perforations comprise at least two longitudinal slots each extending over respective opposite edges of said plate, along and facing a portion of the antenna turn, where each slot also open on the respective opposite edges of the plate via a passage formed on said respective opposite edges.

* * * * *